No. 855,442. PATENTED JUNE 4, 1907.
H. N. BICKERTON, H. W. BRADLEY & D. CLERK.
EXPLOSION ENGINE.
APPLICATION FILED JULY 6, 1904.
3 SHEETS—SHEET 1.
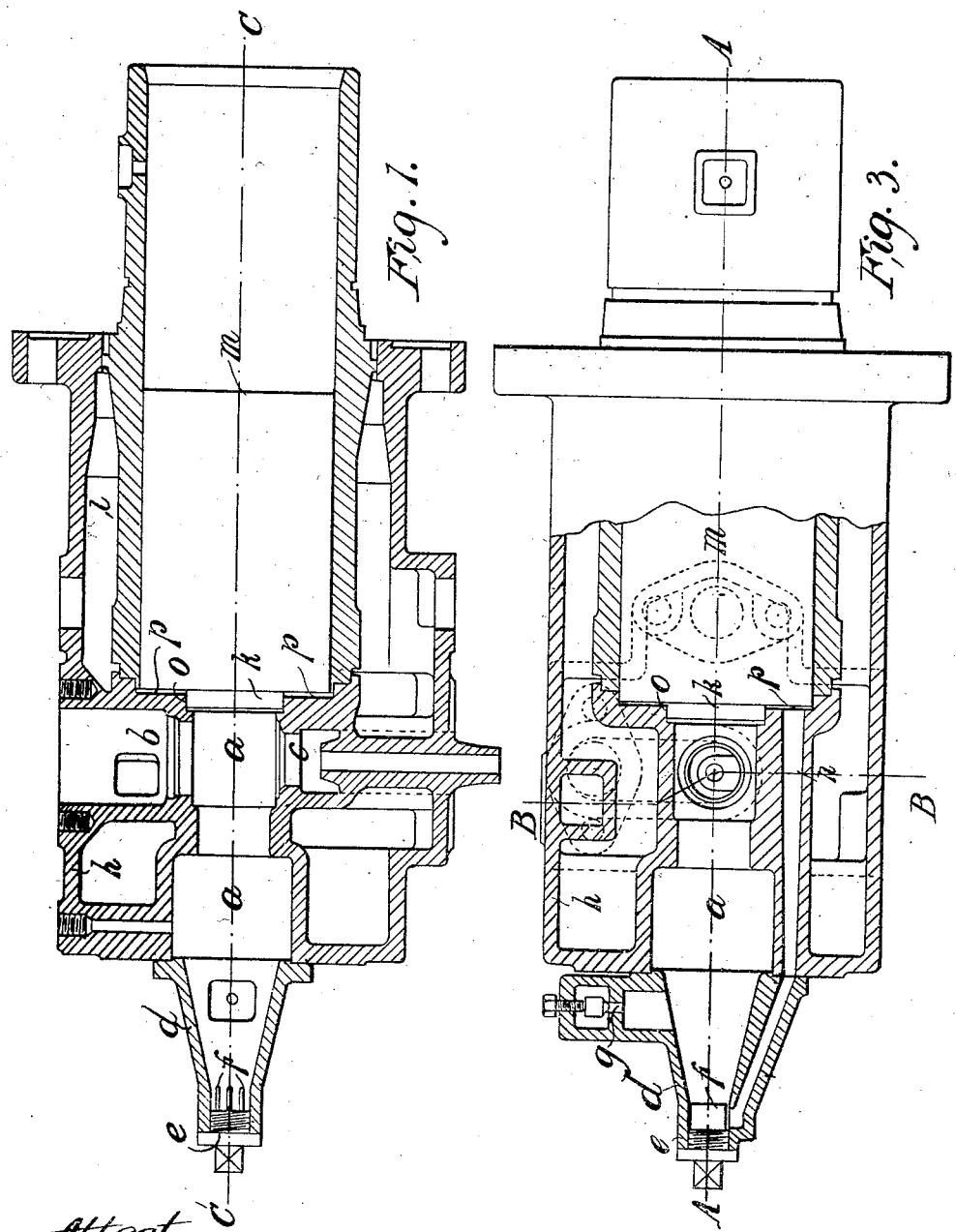

No. 855,442. PATENTED JUNE 4, 1907.
H. N. BICKERTON, H. W. BRADLEY & D. CLERK.
EXPLOSION ENGINE.
APPLICATION FILED JULY 6, 1904.
3 SHEETS—SHEET 2.
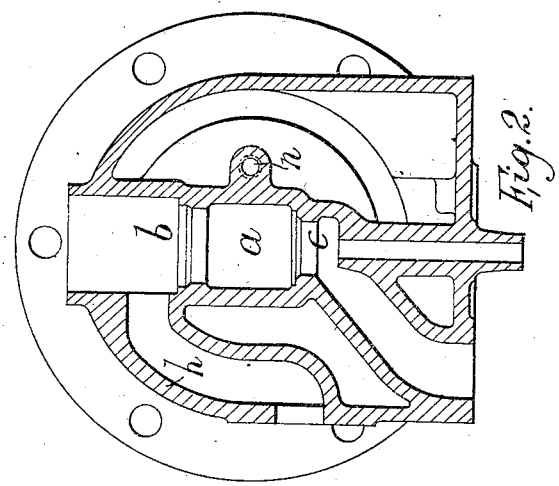

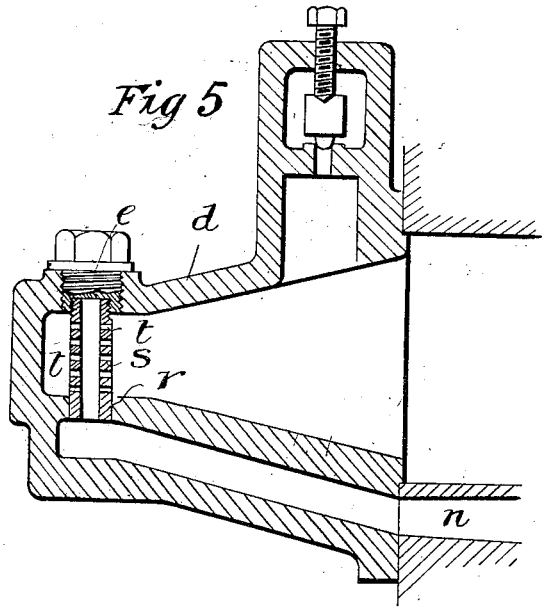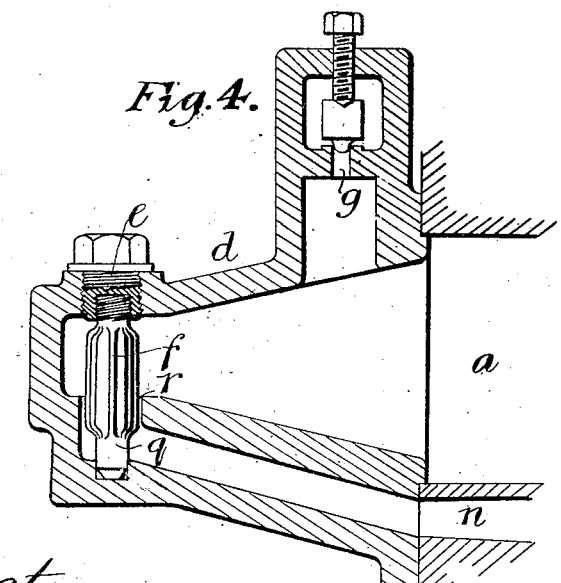

UNITED STATES PATENT OFFICE.

HENRY NIELD BICKERTON AND HENRY WENTWORTH BRADLEY, OF ASHTON-UNDER-LYNE, AND DUGALD CLERK, OF EWHURST, ENGLAND.

EXPLOSION-ENGINE.

No. 855,442.

Specification of Letters Patent.

Application filed July 6, 1904. Serial No. 215,527.

Patented June 4, 1907.

*To all whom it may concern:*

Be it known that we, HENRY NIELD BICKERTON, a subject of the King of Great Britain and Ireland, and HENRY WENTWORTH BRADLEY, a subject of the King of Great Britain and Ireland, both residing at Wellington Works, Ashton-under-Lyne, in the county of Lancaster, England, and DUGALD CLERK, a subject of the King of Great Britain and Ireland, residing at Little Woolpits, Ewhurst, in the county of Surrey, England, have invented certain new and useful Improvements in Explosion-Engines, of which the following is a specification.

Our invention relates to engines operated by the explosion or mixtures of inflammable vapor and air or inflammable gas and air; and it is applicable mainly to engines intended to use heavy oil in which the oil is vaporized by a hot surface forming part of the combustion space, and the mixture is also ignited by the heat of the combustion chamber or a part of it.

In engines of this type at present in use, the ignition is somewhat irregular; that is, the time of firing is difficult to control, and it is not easy to obtain a series of ignitions, even at uniform load, in which the impulses are equal, and the pressure rises on the same line.

The object of our invention is to produce an engine capable of using high compressions and also capable of igniting with greater regularity than has been hitherto found possible.

Our invention consists in providing a somewhat elongated combustion chamber, which combustion chamber is, as usual, water jacketed, and preferably forms part of the engine casing. This elongated combustion chamber is fitted with an external cap or plate which is not water jacketed, and this cap or plate is heated initially in a manner well understood, and its heat is maintained by successive explosions when the engine has started. The inlet and exhaust valves are placed within the water jacketed portion of the combustion chamber, and the combustion chamber communicates with the motor cylinder by an aperture of relatively small diameter. The piston carries a plug which enters into this aperture at the in end of the stroke, and a passage of small diameter passes from the annular space so inclosed through the combustion space, and terminates in a jet which impinges upon the hot plate or hot cap before described.

An important part of our invention consists in this arrangement for causing a rapidly flowing jet of air to strike the hot plate just at the end of the stroke. This jet of air striking the hot plate and mixing with the inflammable vapor near the hot part is found to act most effectively in timing the ignition and producing a powerful explosion of well mixed vapor and air.

Referring to the accompanying drawings:—Figure 1 is a sectional side elevation on the line A A of Fig. 3 of the cylinder and combustion chamber of an oil engine in accordance with one form of our invention. Fig. 2 is a sectional end elevation of the same on the line B B of Fig. 3. Fig. 3 is a part sectional plan of the same on the line C C of Fig. 1. Fig. 4 is a similar sectional plan showing ribs formed on a rod carried by the cap. Fig. 5 is a similar sectional plan showing a metallic tube projecting across the end of the cap.

In carrying out the invention according to the construction shown in Figs. 1 to 5, as applied to an "Otto" cycle oil engine, we provide a somewhat elongated combustion space $a$ carrying within it the exhaust and air inlet valves $b$ and $c$ respectively. These valves may be opposite each other, or may be placed side by side in a manner well understood in oil engine and gas engine construction.

A large part $h$ of the combustion chamber is formed together with the engine casing $i$, and it is water jacketed. A vaporizing cap $d$ which is conical in form is bolted to the end, and forms a continuation of this combustion chamber. The cap may be provided with ribs or metallic projections to assist igniting, and to some extent vaporizing. The ribs may be conveniently formed on the end of a plug $e$ screwed into the cap as shown in Figs. 4 and 5, the ribs being denoted therein by the reference letter $f$.

An oil jet $g$ is provided which is thrown by an oil pump and caused to impinge against the hot cap which is heated initially by a lamp, as is usual in engines of this type. The oil is injected during the suction stroke. Part of it vaporizes on the hot surface during the suction stroke, and some of the vapor is carried away by the air passing into the combustion chamber by means of the inlet valve c. This tends to produce a better mixture than is usual in such engines.

On the compression stroke, further vaporizing of the film of oil injected upon the hot part occurs, but ignition does not take place until just at the end of the compression stroke, when a plug or circular extension k on the end of the piston m enters a corresponding recess o in the aperture leading to the combustion space. An annulus or local compression space p is thus formed which is in communication with the remote end of the cap by a passage n, and when the plug k enters the recess o a puff of air is injected rapidly through the passage n into the end of the cap. This air impinges upon the hot ribs f of the plug e, mixes with the oil vapor in contact therewith, and at once produces a highly inflammable mixture just at the hottest part of the combustion space. Ignition occurs at once, and a powerful and accurately timed impulse is given.

The heat of the incandescent surfaces of the metal ribs f is maintained by a small volume of flame or burning gas which is sucked among the ribs in flowing by way of the passage n to fill the annulus p immediately the piston commences its out stroke. This suction of flame continues until the piston plug has left the recess o. It is found that this contrivance of throwing an air jet upon a hot surface to mix this fresh air with the inflammable vapor immediately in contact with the hot surface produces a very reliable explosion, whether a small amount of oil has been injected or a large amount. The engine therefore ignites regularly without missing impulses. By this combination of an elongated combustion chamber carrying inlet and exhaust valves within it, a hot cap for vaporizing and igniting, and an air jet sent from the cylinder just at the end of the stroke, we are enabled to obtain an exceedingly reliable and economical heavy oil engine.

In a small engine we prefer to obtain the air jet for mixing and igniting from the motor piston itself by the means described. The principle, may, however, also be applied by providing, separately, compressed air, compressed by any suitable pump, and injected at the right moment against the hot surface.

Instead of providing the cap with its ribs carried by a plug, as hereinbefore described, ribs f may be formed directly on a small rod q which may be screwed into the plug e end inserted in the opening r of the air passage n, as shown in Fig. 4. It will be readily seen that ribs carried by the cap in this manner perform the same functions, and will be heated in the same manner as the ribs on the end of the plug. The rod q may readily be removed and replaced by a new one when occasion requires.

In another form we replace the ribs by a small perforated tube s as shown in Fig. 5. One end of the tube enters the opening r of the air passage, and the other end is screwed into the plug e. At the commencement of the outstroke of the engine the flame is sucked into the tube through the holes t and the tube is raised to a high temperature. At the end of the compression stroke air from the annulus is forced through the perforations in the tube, whereby a combustible mixture is formed in contact with the hot walls of the tube, and ignition effected as before.

In some cases when using heavy oil, we provide high pressure air to break up the oil when injected into the cylinder. This high pressure air we may obtain by a separate pump compressing from atmosphere to the high pressure; but we prefer that pump to draw from the compression space air already compressed to some extent for the purpose of raising the pressure by a small pump or plunger. This enables us to produce sufficient high pressure air to break up the heavy oil.

Having now described our invention, what we claim as new and desire to secure by Letters Patent is:—

1. In combination in an internal combustion engine, a cooled elongated combustion chamber, and uncooled closing cap of tapered form, a recess in the combustion chamber at the entrance to the cylinder, a projection on the end of the piston adapted to enter the recess so as to form at the end of the compression stroke a local air compression space, a passage of communication between the local compression space and the end of the combustion chamber remote from the piston and exhaust and air supply valves in the combustion chamber near the local compression space, substantially as described.

2. In combination in an internal combustion engine, a cooled elongated combustion chamber, and uncooled closing cap of tapered form, a recess in the combustion chamber at the entrance to the cylinder, a projection on the end of the piston adapted to enter the recess so as to form at the end of the compression stroke a local air compression space, a passage of communication between the local compression space and the end of the combustion chamber remote from the piston, removable igniting surfaces placed at the end of the tapered cap opposite to the opening into the cap of the passage, and exhaust and air supply valves in the combustion chamber near the local compression space, substantially as described.

3. In combination in an internal combustion engine using liquid fuel, a cooled elongated combustion chamber closed by a conical vaporizing cap, a recess in the combustion chamber at the entrance to the cylinder, a projection on the end of the piston adapted to enter the recess so as to form at the end of the compression stroke a local air compression space, a passage of communication between the local compression space and the end of the combustion chamber remote from the piston, removable igniting surfaces placed at the end of the tapered cap opposite to the opening into the cap of the passage, and exhaust and air supply valves in the combustion chamber near the local compression space substantially as described.

In witness whereof we have hereunto set our hands in the presence of two witnesses:

HENRY NIELD BICKERTON.
HENRY WENTWORTH BRADLEY.
DUGALD CLERK.

Witnesses to the signatures of the said Henry Nield Bickerton and Henry Wentworth Bradley:

ROBERT MORRISON NEILSON,
VIVIAN ARTHUR HUGHES.

Witnesses to the signature of the said Dugald Clerk:

ALBERT E. PARKER,
GEORGE I. BRIDGES.